United States Patent [19]

Hill et al.

[11] 4,072,371
[45] Feb. 7, 1978

[54] BEARINGS FOR RAILWAY VEHICLE AXLES

[75] Inventors: Joseph Henry Hill, Greenford; David Frederick Green, Maidenhead, both of England

[73] Assignee: Vandervell Products Limited, England

[21] Appl. No.: 683,969

[22] Filed: May 6, 1976

[51] Int. Cl.² ............................................. F16C 33/04
[52] U.S. Cl. ...................................................... 308/56
[58] Field of Search ...................... 308/38, 41, 43, 54, 308/56, 57, 79.1, 81

[56] References Cited

U.S. PATENT DOCUMENTS

| 1,121,904 | 12/1914 | Doehler | 308/79.1 X |
| 2,251,720 | 8/1941 | Savage | 308/79.1 |
| 2,368,677 | 2/1945 | Pearce | 308/56 X |
| 3,799,632 | 3/1974 | Hill et al. | 308/56 |
| 3,838,900 | 10/1974 | Robinson | 308/43 |

FOREIGN PATENT DOCUMENTS 567,025  1/1945  United Kingdom ........... 308/56 UX

Primary Examiner—Joseph F. Peters, Jr.
Assistant Examiner—Gene A. Church
Attorney, Agent, or Firm—Edward F. Connors

[57] ABSTRACT

The disclosure relates to a railway vehicle bearing having a metal block with a part cylindrical recess extending around one face of the block between opposed end faces thereof. A journal bearing liner or a bearing lining extends along the recess to receive the vehicle axle for rotation. The end faces of the block are provided with thrust plates or the end surfaces of the block are provided with hardened faces to withstand thrust forces imposed by thrust faces on the axle.

16 Claims, 7 Drawing Figures

U.S. Patent  Feb. 7, 1978  Sheet 1 of 2  4,072,371
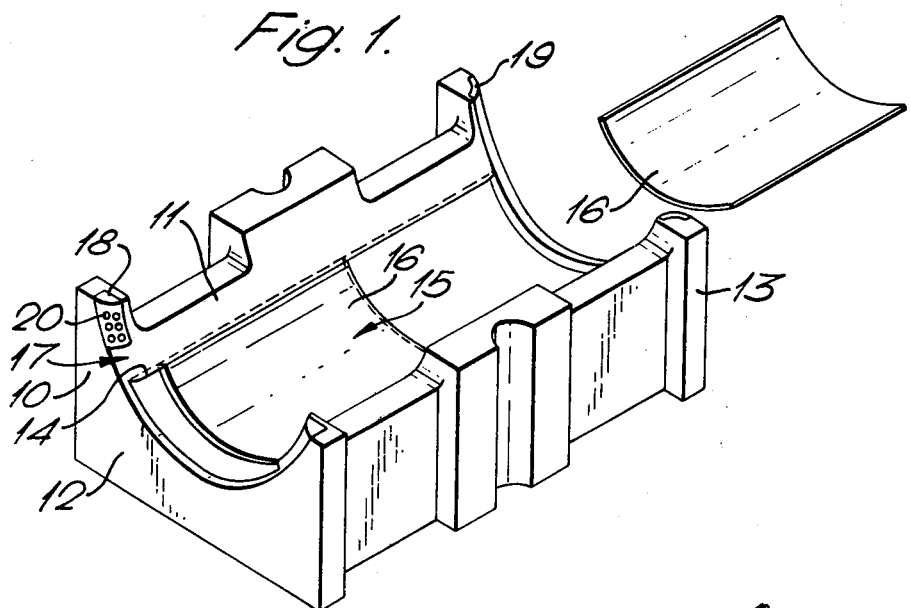
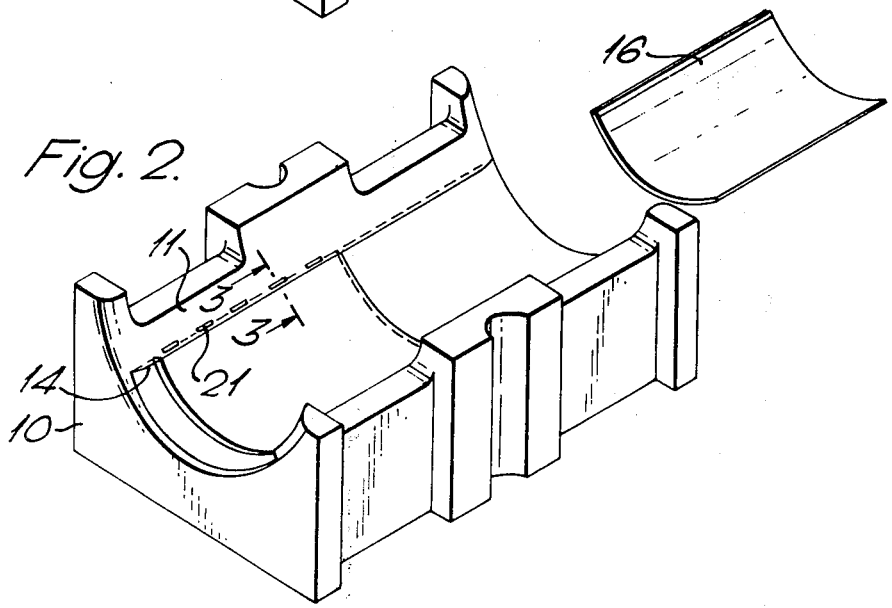
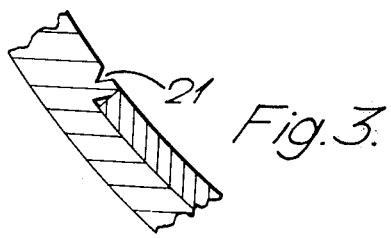

BEARINGS FOR RAILWAY VEHICLE AXLES

BACKGROUND OF THE INVENTION

This invention relates to bearings for railway vehicle axles.

DESCRIPTION OF THE PRIOR ART

U.S. Pat. Nos. 3,799,632 and 3,838,900 disclose bearings for railway vehicle axles comprising a bearing block formed from an aluminium silicon alloy. The bearing block has a part cylindrical recess in which a bearing liner for receiving the vehicle axle is held by an arrangement of keys. The liner which may be formed in two end-to-end parts has out-turned flanges at the ends of the block which overlie the ends of the block to receive thrust forces imposed by thrust faces on the axle. If very high thrust forces are imposed on the out-turned flanges of the liner, the flanges may be worn rapidly away and will require replacement. If the flanges are worn away and the thrust faces on the axle run on the end faces of the block, rapid wear of the block will occur and the block will no longer be suitable for further use with a new bearing liner.

The object of the present invention is therefore to overcome the problems of wear of the thrust flanges on the liner.

SUMMARY OF THE INVENTION

The invention provides a bearing for vehicle axles comprising a metal block having a part cylindrical recess extending along one face of the block between opposed end faces of the block, a journal bearing liner or a bearing lining extending along said recesses to support the vehicle axle for rotation, and means on the end faces of the block to provide thrust faces for engaging thrust faces on the axle to limit axial movement of the axle with respect to the bearing.

BRIEF DESCRIPTION OF THE DRAWINGS

FIG. 1 is a perspective view of a railway bearing illustrating a number of different constructions;

FIG. 2 is a perspective view of a further railway bearing;

FIG. 3 is a section on the line 3—3 of FIG. 2;

DESCRIPTION OF THE PREFERRED EMBODIMENT

Figure 4:
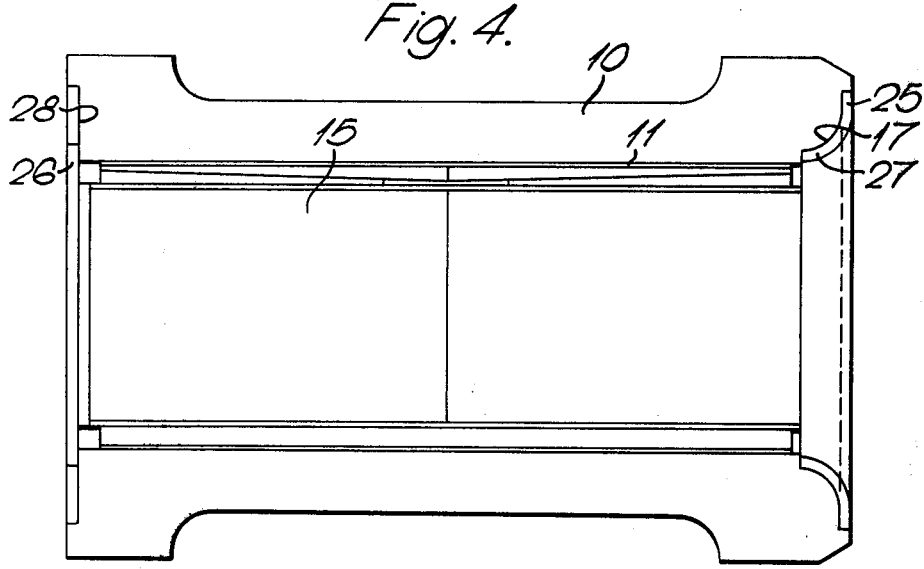
FIG. 4 is a sectional view of a further form of railway bearing having thrust plates secured to the end of the block and FIGS. 5 to 7 show the thrust plates in greater detail.

Referring firstly to FIG. 1 of the drawings there is shown a railway bearing for a railway wagon axle comprising a metal block 10 having a part cylindrical recess 11 extending along one face of the block between opposed end faces 12, 13 of the block. The block may be formed from high purity versions of aluminium-silicon alloys such as LM25 and LM6 quenched and solution treated to improve their physical properties, a ferrous metal such as cast iron, cast steel, or malleable iron, or a copper based alloy such as bronze.

The cylindrical recess 11 in the block is formed with an arcuate groove 14 extending along the length of the recess in which a thin wall flexible arcuate journal bearing liner, indicated generally at 15, is located. The liner 15 is formed in two parts 16 located end to end along the recess. The liner parts stop well short of the end faces 12, 13 of the block. The liner may be formed from backed or unbacked fine grained lead based babbit strip or tin based babbit and each liner part tapers towards the end located at the centre of the recess and is a force fit in the groove 14 so that the liner parts are held against the surface of the block to provide good heat conduction to the block.

The corners of the end faces 12, 13 around the recess 11 are convexly radiused as indicated at 17 to engage concavely recessed fillets which provide thrust faces on the axle. At the corners, inserts 18 of bearing materials such as fibre reinforced aluminium alloys or fibre reinforced babbit let into the corners of the block. Further bearing materials suitable for the insert are the fibre reinforced metal matrix materials described in U.K. Specification Nos. 1,373,485; 1,375,541 and 1,373,542 which are known are "Fibre Kote" and also graphitic aluminium alloys as described in U.K. Patent Specification Nos. 1,207,538 and 1,207,539. In a further arrangement, the surface of the aluminium silicon block may be indented as indicated at 20 and the indents left empty to receive the conventional liquid lubricant supplied to the bearing in use or may be filled with a solid lubricant such as an epoxy resin composition containing polytetrafluoroethylene, "Fibre Kote", or graphitic aluminium alloy as described above.

In a further arrangement, the end faces 12 and corners 17 of the block may be hard anodised, or the surfaces may be etched to reveal the silicon content of the alloy and to provide micropits to retain liquid lubricant.

FIG. 2 shows a further arrangement for holding the liner parts 16 in the block 10. After the liners 16 have been inserted in the block, a tool is used to press out stakes spaced along one side of the groove 14 as indicated at 21 to hold the liner parts 16 in the groove.

The liner parts 16 may also be held in the recess 11 in the block by an arrangement of tapered keys similar to that described in our U.S. Pat. Nos. 3,799,632 and 3,838,900.

In yet a further arrangement, the liners may be inserted in the block by first heating the block and/or cooling the liners until sufficient expansion of the block and/or contraction of the liner has occurred to permit the liner to be inserted in the block.

Figure 5:
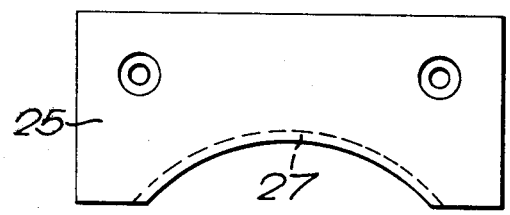
Figure 6:
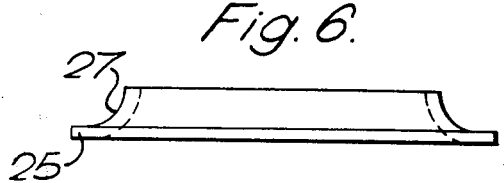
Figure 7:
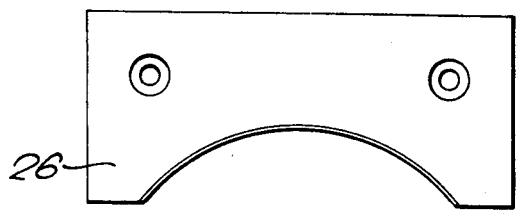

FIGS. 4 to 7 show a further arrangement in which thrust plates 25, 26 are secured by set screws to opposed ends of the block. The inner end only of the block has a radiused corner between the recess 11 and end face and the thrust plate 25 at the inner end has an integral curved flange 27 which extends over the radiused corner. The thrust plate 26 at the outer end of the block is let into a recess 28 in the said end of the block. A small chamfer (not shown) is formed between the recess 11 in the block and outer end face of the block to provide clearance from the aforesaid fillet radius on the axle so that thrust loads from the axle are taken on the thrust plate. The thrust plates, are formed from aluminium-silicon alloy with or without fibre reinforcement and with or without a steel back or any other bearing material selected for its wear resistance properties such as steel backed "Fibre Kote" or graphitic aluminium alloy as referred to earlier.

In a modification of the above arrangement, the thrust plate 25 at the inner end of the block is dispensed with and the block has a radiused corner between the recess 11 and inner end face to engage the radiused fillet on the axle and take thrust loads therefrom. The outer end of the block has a thrust plate 26 as described above.

In a modification of the latter arrangement, the thrust plate at the outer end of the block is dispensed with and the corner of the block between recess 11 and the outer end face is chamfered to clear the fillet radius on the axle so that thrust loads from the axle are taken directly on the outer end face of the block.

In a still further modification of the above arrangements the curved flange 27 of thrust plate 25 is formed on the adjacent end of the journal bearing liner 15 located in the recess 11 rather than the plate.

We claim:

1. A bearing for a vehicle axle comprising a metal block having a part cylindrical recess extending along one face of the block between opposed end faces of the block, a journal bearing lining extending along said recess to support the vehicle axle for rotation, the end faces of the block having convexly radiussed corners merging with said part cylindrical recess and the surface of each corner having indents to provide pits for receiving lubricant.

2. A bearing as claimed in claim 1 wherein said pits are filled with solid lubricant.

3. A bearing as claimed in claim 2 wherein the solid lubricant is an epoxy resin composition containing polytetrafluoroethylene particles.

4. A bearing for a vehicle axle comprising a metal block having a part cylindrical recess extending along one face of the block between opposed end faces of the block, a journal bearing lining extending along said recess to support the vehicle axle for rotation, the end faces of the block having convexly radiussed corners merging with said part cylindrical recess, said radiussed corners having hard anodized surfaces.

5. A bearing for a vehicle axle comprising a metal block having a part cylindrical recess extending along one face of the block between opposed end faces of the block, a journal bearing lining extending along said recess to support the vehicle axle for rotation, the end faces of the block having convexly radiussed corners merging with said part cylindrical recess, the block being formed from an aluminum silicon alloy and the surfaces of the radiussed corners being etched to reveal the silicon and to provide micropits for lubricant.

6. A bearing for a vehicle axle comprising a metal block having a part cylindrical recess extending along one face of the block between opposed end faces of the block, a journal bearing lining extending along said recess to support the vehicle axle for rotation, the end faces of the block having convexly radiussed corners merging with said part cylindrical recess and at least the surfaces of said radiussed corners being phosphated.

7. A bearing as claimed in claim 6 wherein the whole of the end faces of the block are phosphated.

8. A bearing for a vehicle axle comprising a metal block having a part cylindrical recess extending along one face of the block between opposed end faces of the block, a journal bearing lining extending along said recess to support the vehicle axle for rotation, the end faces of the block having convexly radiussed corners merging with said part cylindrical recess, the radiussed corners being formed on inserts in the block and having fiber reinforcement.

9. A bearing for a vehicle axle comprising a metal block having a part cylindrical recess extending along one face of the block between opposed end faces of the block, a journal bearing lining extending along said recess to support the vehicle axle for rotation and a thrust plate secured at at least one end of the block to provide a thrust face at that end of the block, said block having a radiussed corner between the recess and end face at said one end of the block and the thrust plate being provided with a curved flange which overlies said radiussed corner.

10. A bearing as claimed in claim 9 wherein the block has a thrust plate at one end only, the end face of the other end of the block being adapted to receive thrust loads directly.

11. A bearing as claimed in claim 9 wherein the thrust plate is formed from an aluminium tin alloy.

12. A bearing as claimed in claim 11 wherein the aluminium tin alloy thrust plate has a steel backing.

13. A bearing as claimed in claim 11 wherein the aluminium tin alloy has fibre reinforcement.

14. A bearing for a vehicle axle comprising a metal block having a part cylindrical recess extending along one face of the block between opposed end faces of the block, a journal bearing lining extending along said recess to support the vehicle axle for rotation and a thrust plate secured at at least one end of the block to provide a thrust face at that end of the block, said block having a radiussed corner between the recess and end face at said one end of the block and the journal bearing lining being provided with a curved flange which overlies said radiussed corner.

15. A bearing for a vehicle axle comprising a metal block having a part cylindrical recess extending along one face of the block between opposed end faces of the block, a journal bearing lining extending along said recess to support the vehicle axle for rotation and a thrust plate secured at at least one end of the block to provide a thrust face at that end of the block, said block having a radiussed corner at one end only, a thrust plate being provided at said one end formed with a curved flange which overlies said radiussed corner and the block has a further plain thrust plate at the other end.

16. A bearing for a vehicle axle comprising a metal block having a part cylindrical recess extending along one face of the block between opposed end faces of the block, a groove extending along said recess, a journal bearing liner formed in two parts located end to end along the groove, the liner parts tapering towards the ends thereof adjacent the center of the recess and being so dimensioned that the liner parts are a force fit in the groove.

* * * * *